US011722436B2

(12) United States Patent
Catalano et al.

(10) Patent No.: US 11,722,436 B2
(45) Date of Patent: Aug. 8, 2023

(54) TRANSPORT CONTROL WORD ARCHITECTURE FOR PHYSICAL PORT MIRRORING

(71) Applicant: International Business Machines Corporation, Armonk, NY (US)

(72) Inventors: Pasquale A. Catalano, Wallkill, NY (US); Michael James Becht, Poughkeepsie, NY (US); Christopher J. Colonna, Ossining, NY (US); Stephen Robert Guendert, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 22 days.

(21) Appl. No.: 17/409,884

(22) Filed: Aug. 24, 2021

(65) Prior Publication Data

US 2023/0066682 A1    Mar. 2, 2023

(51) Int. Cl.
*H04L 12/931*        (2013.01)
*H04L 49/20*         (2022.01)
(Continued)

(52) U.S. Cl.
CPC .......... *H04L 49/208* (2013.01); *G06F 13/126* (2013.01); *H04L 49/102* (2013.01); *H04L 49/9094* (2013.01)

(58) Field of Classification Search
CPC .......................... G06F 15/17331; H04L 49/208
(Continued)

(56) References Cited

U.S. PATENT DOCUMENTS 6,718,347 B1    4/2004  Wilson
7,209,476 B1    4/2007  Colloff et al.
(Continued)

FOREIGN PATENT DOCUMENTS

CN      1798101 A      7/2006
CN    101247340 A      8/2008
(Continued)

OTHER PUBLICATIONS

International Search Report; International Application No. PCT/CN2022/112798; International Filing Date: Aug. 16, 2022; dated Nov. 15, 2022; 9 pages.

(Continued)

*Primary Examiner* — Robert J Lopata
(74) *Attorney, Agent, or Firm* — Cantor Colburn LLP; Edward Wixted

(57) ABSTRACT

Aspects include receiving, at an input/output (I/O) processor, a transport control word (TCW) that includes an instruction to perform physical port mirroring. It is identified, by the I/O processor, a first port to be mirrored and a second port to perform the mirroring. The second port is a physical port on a host bus adapter (HBA). In response to outbound data being sent to the first port for transmission to a first target device and to the instruction specifying outbound port mirroring, the I/O processor sends a copy of the outbound data to a second target device via the second port. In response to receiving inbound data at the first port and to the instruction specifying inbound port mirroring, a copy of the inbound data is transmitted to the second target device via the second port.

20 Claims, 14 Drawing Sheets

(51) Int. Cl.
*G06F 13/12* (2006.01)
*H04L 49/90* (2022.01)
*H04L 49/102* (2022.01)

(58) Field of Classification Search
USPC ........................................................ 370/390
See application file for complete search history.

(56) References Cited

U.S. PATENT DOCUMENTS

| | | | |
|---|---|---|---|
| 8,117,347 B2 | 2/2012 | Flanagan et al. | |
| 8,549,185 B2 | 10/2013 | Candelaria et al. | |
| 9,203,711 B2 | 12/2015 | Agarwal et al. | |
| 9,477,414 B1 | 10/2016 | Gokhale | |
| 9,912,536 B2 | 3/2018 | Mcdaniel et al. | |
| 10,684,885 B2 | 6/2020 | Gao et al. | |
| 10,887,361 B2 | 1/2021 | Jiang et al. | |
| 10,924,433 B2 | 2/2021 | Suzuki | |
| 11,349,861 B1* | 5/2022 | Costlow | H04L 43/062 |
| 2005/0081099 A1 | 4/2005 | Chang et al. | |
| 2005/0256972 A1 | 11/2005 | Cochran et al. | |
| 2006/0114907 A1 | 6/2006 | Wu | |
| 2006/0221842 A1 | 10/2006 | Terry | |
| 2009/0080338 A1 | 3/2009 | Parker et al. | |
| 2012/0311287 A1 | 6/2012 | Bubb et al. | |
| 2012/0291026 A1 | 11/2012 | Biswas et al. | |
| 2013/0007303 A1 | 1/2013 | Candelaria | |
| 2013/0205050 A1* | 8/2013 | Gainey, Jr. | G06F 13/4282 710/38 |
| 2014/0098822 A1 | 4/2014 | Galles et al. | |
| 2014/0379955 A1 | 12/2014 | Dong et al. | |
| 2015/0101053 A1* | 4/2015 | Sipple | H04L 63/1425 726/24 |
| 2015/0120963 A1* | 4/2015 | Carlson | G06F 13/42 710/5 |
| 2015/0341365 A1* | 11/2015 | Basso | H04L 67/1095 711/108 |
| 2016/0077881 A1* | 3/2016 | Anderson | G06F 9/4881 718/104 |
| 2016/0269482 A1* | 9/2016 | Jamjoom | H04L 67/1095 |
| 2016/0294731 A1 | 10/2016 | Mcdaniel et al. | |
| 2016/0342525 A1 | 11/2016 | Casper et al. | |
| 2017/0048312 A1* | 2/2017 | Moyer | H04L 43/20 |
| 2018/0241610 A1* | 8/2018 | Wang | H04L 41/0895 |
| 2018/0278686 A1 | 9/2018 | Sprague et al. | |
| 2018/0349163 A1* | 12/2018 | Gao | H04L 49/208 |
| 2019/0116132 A1* | 4/2019 | Suzuki | G06F 9/542 |
| 2019/0132260 A1* | 5/2019 | Suzuki | H04L 47/31 |
| 2019/0173806 A1* | 6/2019 | Kaku | H04L 49/208 |
| 2019/0258505 A1 | 8/2019 | Gao et al. | |
| 2019/0306084 A1* | 10/2019 | Suzuki | H04L 69/40 |
| 2020/0053024 A1 | 2/2020 | Suzuki et al. | |
| 2020/0092299 A1 | 3/2020 | Srinivasan et al. | |
| 2020/0044895 A1 | 6/2020 | Mittal et al. | |
| 2020/0213246 A1* | 7/2020 | Pan | G06F 15/17331 |
| 2020/0403826 A1 | 12/2020 | Dawani et al. | |
| 2021/0119827 A1 | 4/2021 | Codandam et al. | |
| 2021/0209047 A1 | 7/2021 | Kim et al. | |
| 2021/0218673 A1* | 7/2021 | Ma | H04L 45/02 |
| 2022/0188248 A1* | 6/2022 | Becht | G06F 13/1668 |

FOREIGN PATENT DOCUMENTS

| | | |
|---|---|---|
| CN | 101707550 A | 5/2010 |
| CN | 103548327 B | 8/2016 |
| CN | 103597451 B | 6/2017 |
| CN | 109189555 A | 1/2019 |
| CN | 109783401 A | 5/2019 |
| CN | 110312046 A | 10/2019 |
| CN | 111913782 A | 11/2020 |
| TW | 201520770 A | 6/2015 |
| WO | 2012168811 A1 | 12/2012 |

OTHER PUBLICATIONS

International Search Report and Written Opinion for International Application No. PCT/CN2022/111723; International Filing Date: Aug. 11, 2022; dated Oct. 26, 2022, 9 pages.

Firestone, Daniel; "VFP: A Virtual Switch Platform For Host SDN In The Public Cloud", NSDI'17 14th USENIX Symposium On, pp. 315-328, Mar. 27-29, 2017.

Juniper et al.; "Remote Port Mirorring For EVPN-VXLAN Fabrics", Juniper Networks Incorporation, pp. 1-31, Oct. 10, 2019.

Kourai et al.; "Synchronized Co-Migration Of Virtual Machines For IDS Offloading In Clouds", CloudCom IEEE 5th International Conference On, pp. 1-10, Dec. 2-5, 2013.

Naik et al.; "NFVPerf: Online Performance Monitoring And Bottleneck Detection For NFV", NFV-SDN IEEE Conference On, pp. 1-7, Nov. 7-10, 2016.

Ricci, Lou; "High Performance FICON Demystified", SHARE in Anaheim, pp. 1-52, Feb. 27-Mar. 4, 2011.

Peter Mell et al., "The NIST Definition of Cloud Computing", NIST, Special Publication 800-145, Sep. 2011, 7 pages.

List of IBM Patents or Patent Applictions Treated as Related; Appendix P; Date Filed Aug. 24, 2021; 2 Pages.

Pasquale A. Catalano et al., "Transport Control Word Architecture for Virtual Port Mirroring", U.S. Appl. No. 17/409,889 filed with the USPTO on Aug. 24, 2021.

* cited by examiner

TRANSPORT CONTROL WORD ARCHITECTURE FOR PHYSICAL PORT MIRRORING

BACKGROUND

The present invention relates generally to facilitating input/output (I/O) processing within a computing environment, and more specifically, to providing a transport control word (TCW) architecture for physical port mirroring.

I/O operations are used to transfer data between memory and I/O devices of an I/O processing system. Data can be written from memory to one or more I/O devices, and data can be read from one or more I/O devices to memory by executing I/O operations.

To facilitate processing of I/O operations, an I/O subsystem of the I/O processing system is often employed. The I/O subsystem is coupled to main memory and the I/O devices of the I/O processing system and directs the flow of information between memory and the I/O devices. One example of an I/O subsystem is a channel subsystem that used uses channel paths as communications media. Each channel path includes a channel coupled to a control unit, the control unit being further coupled to one or more I/O devices.

A channel subsystem and I/O device may operate in a transport mode that supports the transfer of one or more command control blocks to transfer data between the I/O devices and memory. A TCW can be used to specify one or more I/O commands to be executed. For commands initiating certain I/O operations, the TCW can designate memory areas associated with the operation as well as an action to be taken when a transfer to or from a memory area is completed.

SUMMARY

Embodiments of the present invention are directed to a transport control word (TCW) architecture for physical port mirroring. A non-limiting example computer-implemented method includes receiving, at an input/output (I/O) processor, a transport control word (TCW) that includes an instruction to perform physical port mirroring. It is identified, by the I/O processor, a first port to be mirrored and a second port to perform the mirroring. The second port is a physical port on a host bus adapter (HBA). In response to outbound data being sent to the first port for transmission to a first target device and to the instruction specifying outbound port mirroring, the I/O processor sends a copy of the outbound data to a second target device via the second port. In response to receiving inbound data at the first port and to the instruction specifying inbound port mirroring, a copy of the inbound data is transmitted to the second target device via the second port.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
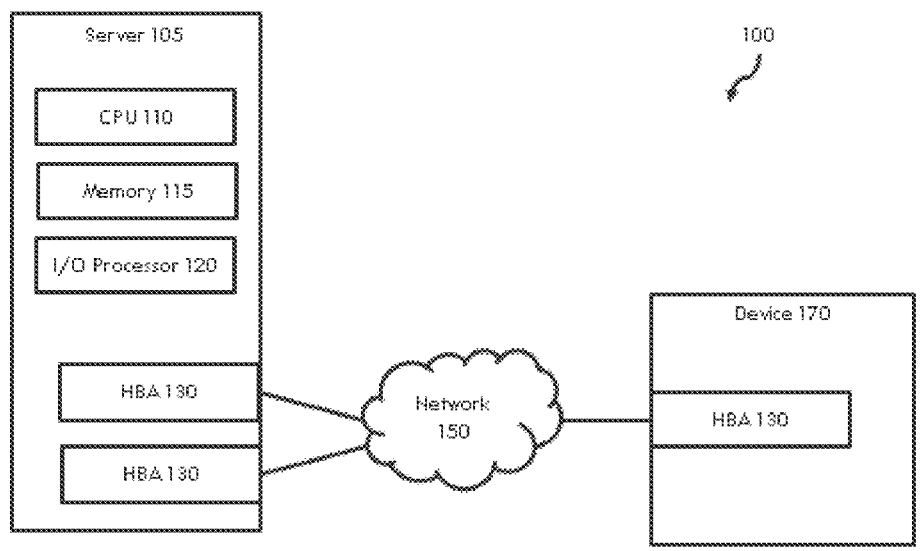
FIG. 1 depicts a block diagram of a computing environment for performing port mirroring according to one or more embodiments of the present invention.

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describe having a communications path between two elements and do not imply a direct connection between the elements with no intervening elements/connections between them. All of these variations are considered a part of the specification.

DETAILED DESCRIPTION

Embodiments of the present invention facilitate input/output (I/O) processing in a computing environment by providing a transport control word (TCW) architecture for inbound and outbound port mirroring. In accordance with one or more embodiments of the present invention, a TCW can be used to cause a mirror copy of inbound data received at the port or outbound data sent from the port to be transmitted to another physical port or to a virtual port. One or more embodiments of the present invention can be utilized to capture inbound data from an I/O device that is received by a port on a host bus adapter (HBA) located on a server. One or more embodiments can also be utilized to capture outbound data sent by the port on the HBA located on the server. The mirrored data can be utilized, for example, to capture inflight data for link traces.

Contemporary methods of link tracing require an external device to capture inflight data, that is data received at a port from a link or data that is transmitted to the link by the port. As used herein, the term "link tracing" refers to the process of identifying the data that was sent on a network link, such as a fiber optic link. The specialized tools currently required for performing link tracing are standalone tools that are expensive and usually only viable for use in test environments, and rarely used in production (e.g., client) environments. Typically, the link testing tool is physically coupled to the port that is currently being tested, and the tool is moved from port to port to test different links. As part of the link tracing, contemporary testing tools capture inbound and/or outbound data and store it in a storage location that is off system, or remote, from the computing environment being tested. Once the data is captured, problem analysis and/or data verification is performed manually.

One or more embodiments of the present invention address one or more of the shortcomings of contemporary link tracing techniques by providing a mechanism within the channel architecture being tested to enable data to be programmatically mirrored for capture or analysis. One or more embodiments output a copy of the data being mirrored to a particular port that can be used to transmit the capture data to a link testing tool or other device. The same particular port can be used to mirror data received at or sent from different ports via a change to a TCW, which eliminates the need to move a testing tool from one port to another to capture data from a different link. In addition, one or more embodiments of the present invention can remove the need for any specialized hardware tools by capturing the link data using mirroring, and transmitting the data (e.g., via a network) to link testing software. Further, one or more embodiments of the present invention can reduce the amount of one or more resources (e.g., computer storage, processor cycles, network traffic, analyst time, etc.) that are utilized to perform link tracing and analysis, for example by applying filters that limit the amount and type of data that is being captured and output to the port providing the mirroring.

Turning now to FIG. 1, a block diagram of a computing environment 100 for performing port mirroring is generally shown in accordance with one or more embodiments of the present invention. The components shown in FIG. 1 include a server 105, a network 150, and a device 170 (e.g., a storage device or other I/O device). All or a portion of the server 105 and the device 170 shown in FIG. 1 can be implemented on one or more computing nodes 10 of FIG. 12 and/or computer system 1400 of FIG. 14. All or a portion of the network 150 shown in FIG. 1 can be implemented by at least a portion of cloud environment 50 of FIG. 12 and/or network 1412 of FIG. 14.

The server 105 shown in FIG. 1 can be implemented by any computer processing system known in the art such as, but not limited to IBM Z® from International Business Machines Corporation. The embodiment of the server 105 shown in FIG. 1 includes central processing unit (CPU) 110, memory 115, I/O processor 120, and HBAs 130. In accordance with one or more embodiments of the present invention, logic in the CPU 110 (e.g., an operating system) creates a control block, such as a TCW, and sends the TCW to the I/O processor 120 for processing. In accordance with one or more embodiments of the present invention, the TCW specifies a transport control block whose contents are to be transported to an I/O device (e.g., device 170) for processing. Example embodiments of TCWs that can be utilized by one or more embodiments of the present invention are described below with reference to FIG. 2 and FIG. 3.

The I/O processor 120 includes logic for interpreting the TCW and for instructing the HBA(s) 130 in the server 105 to take the actions specified by the TCW. In addition, the I/O processor 120 interfaces with the CPU 110 and the memory 115. In accordance with one or more embodiments of the present invention, the I/O processor 120 and the HBAs 130 in the server 105 are coupled via one or more connections or buses such as, but not limited to, one or more Peripheral Component Interconnect express (PCIe) connections. The I/O processor 120 can receive TCWs from the CPU 110 or it can fetch TCWs from the CPU 110 or from the memory 115.

The server 105 shown in FIG. 1 also includes host bus adapters (HBAs) 130 which can be implemented as circuit boards and/or integrated circuit adapters that provide I/O processing and physical connectivity between the server 105 and the device 170 (e.g., a storage and/or network device). The HBAs 130 can be used in conjunction with the I/O processor 120 as an I/O interface to relieve the server 105 of both data storage and data retrieval tasks. Each HBA 130, or I/O card, includes a plurality of physical ports. In accordance with one or more embodiments of the present invention, the physical ports of the HBAs 130 are physically coupled to links (e.g., fiber optic cables or other network links) in order to provide a communication path between the HBA 130 on the server 105 and an HBA 130 on the device 170.

As used herein, the term "physical port" refers to a physical port (e.g., it includes hardware) on an HBA 130, and the term "virtual port" refers to a portion of memory 115. The virtual port may be implemented by any method known in the art for storing a collection of data in memory, such as plurality of contiguous memory locations in memory and/or a memory array. Contents of the virtual port can also be spread across multiple physical memories. The virtual port may be denoted as a direct memory address or as an indirect memory address. The combination of the links, the I/O processor 120 and the HBAs 130 on the server 105 and the HBA 130 on the device 170 can be referred to as a "channel." The functions specified by the TCW and performed by the I/O processor 120 and HBAs 130 can be referred to as a "channel program."

The computing environment 100 shown in FIG. 1 also includes a device 170. In accordance with one or more embodiments of the present invention, the device 170 includes an HBA 130 for communicating with an HBA 130 on the server 105. As shown in FIG. 1, the device 170 is the target device that the server 105 is communicating with. The device 170 can be any component that the server 105 sends data to or receives data from such as, but not limited to: a control unit, a direct access storage device (DASD), a tape drive, and/or another server. In another embodiment, device 170 may be on or a component of server 105.

In accordance with one or more embodiments of the present invention, the computing environment 100 utilizes a FICON®, High Performance FICON (zHPF), or a zHyperLink (zHL) I/O interface from International Business Machines Corporation for connecting the server 105 to the device 170. FICON, zHPF, zHL, or a mix of all channel types and configurations can be implemented by one or more embodiments of the present invention to facilitate the processing of I/O requests that are described in TCWs.

The network 150 shown in FIG. 1 is used to couple one or more HBAs 130 on the server 105 to one or more HBAs 130 on the device 170. The network 150 can be implemented using any one or more short range or long range wired, wireless, and/or optical networks known in the art. The network 150 may also include additional devices, such as network switches, routers, or any other networking devices (not shown).

For ease of description, FIG. 1 shows two HBAs 130 on server 105. One skilled in the art will recognize that one or more embodiments of the invention can include a server with eight or sixteen or hundreds or thousands of HBAs 130 connecting to the network 150 and/or to one or more other networks (not shown). Also, for ease of description, FIG. 1 shows one HBA 130 on device 170. One skilled in the art will recognize that one or more embodiments of the invention can include a device with eight or sixteen or hundreds or thousands of adapters connecting to network 150 and/or to one or more other servers (not shown).

The embodiments described herein with respect to the computing environment 100 of FIG. 1 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

It is to be understood that the block diagram of FIG. 1 is not intended to indicate that the system is to include all of the components shown in FIG. 1. Rather, the system can include any appropriate fewer or additional components not illustrated in FIG. 1 such as, but not limited to one or more additional HBAs 130, devices 170, servers 105 and/or networks 140. In addition, the components shown in FIG. 1 may be arranged differently. For example, the CPU 110 and the I/O processor 120 may located on different servers 105, or they may part of the same processing unit.

Figure 2:
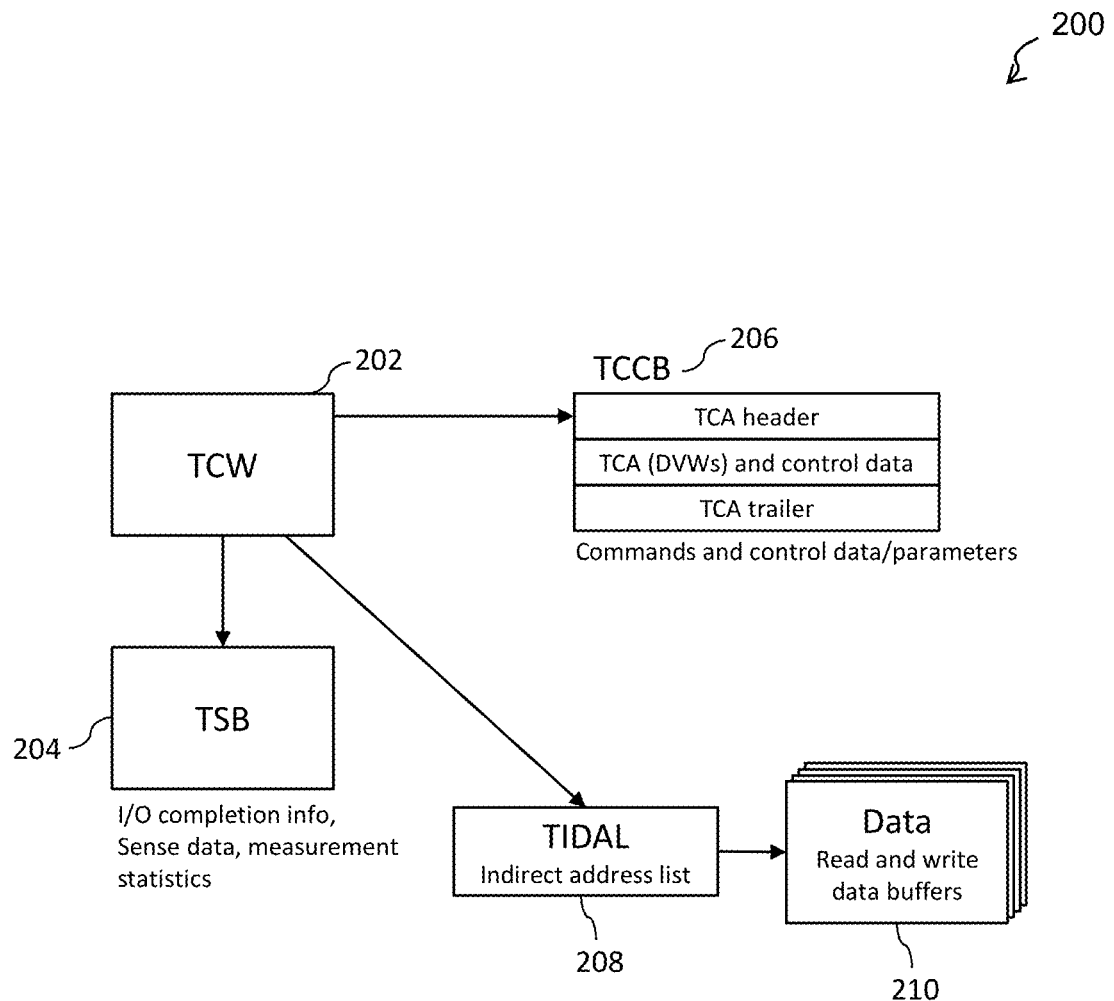
FIG. 2 depicts a block diagram of a transport control word (TCW) for performing port mirroring according to one or more embodiments of the present invention.

Turning now to FIG. 2, a block diagram 200 of a TCW 202 for performing port mirroring is generally shown in accordance with one or more embodiments of the present invention. The TCW 202 shown in FIG. 2 contains pointers to all of the other areas of the channel program and the number of bytes to be read or written. The channel uses the TCW 202 to transport the commands and data to a target device, such as device 170 of FIG. 1, and to locate the status block used to store ending status information.

As shown in FIG. 2, the TCW 202 points to a transport status block (TSB) 204 that contains I/O completion information, sense data, and measurement statistics. The TCW 202 shown in FIG. 2 also points to a transport command control block (TCCB) 206 that contains the commands and control data parameters to be passed to the target device. The TCCB 206 shown in FIG. 2 includes three parts: a transport control area header (TCAH) containing information about the transport control area (TCA); the TCA containing the commands and control parameters; and a TCA trailer (TCAT) that contains the number of bytes transferred. As shown in FIG. 2, each command in the TCA is represented by a device control word (DCW) that includes a command code, flags to indicate chaining and other options, a control data count, and a data byte count if the command is used to transfer data. If the command transfers control data (command parameters) to the device, the control data follows the DCW in the TCA. I/O buffers for all DCWs are pointed to by the TCW 202, and the I/O buffers associated with a particular DCW are based on the amount of data transferred by the previous DCWs. In accordance with one or more embodiments of the present invention, the maximum size of the TCA is two-hundred and forty bytes.

The TCCB 206 may be pointed to either directly by the TCW 202 or indirectly via a transport indirect address list (TIDAL) 208. The TCW 202 may point to a single or multiple read and/or write buffers containing data 210. The data 210 can be accessed directly via an address in the TCCB 206 or indirectly via the TIDAL 208.

Figure 3:
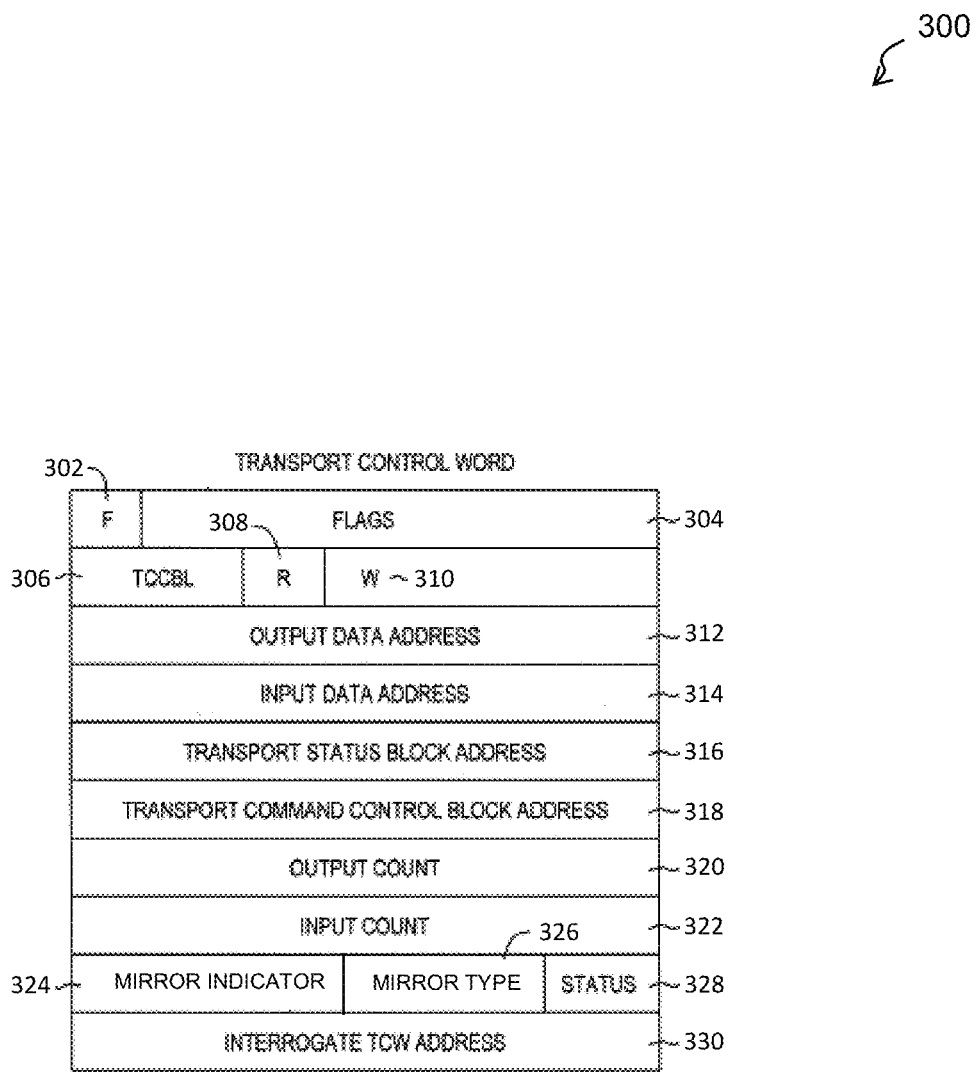
FIG. 3 depicts contents of a TCW for performing port mirroring according to one or more embodiments of the present invention.

Turning now to FIG. 3, example content of a TCW 300 for performing port mirroring is generally shown in accordance with one or more embodiments of the present invention. In the embodiment shown in FIG. 3, the TCW 300 is a sixty-four-byte control block that is designated on, for instance, a sixty-four-byte boundary. In the embodiment shown in FIG. 3, the TCW 300 includes a plurality of fields including:

Format (F) field 302: This field forms a TCW that contains a 2-bit unsigned integer value that defines the layout of the TCW. The value of this field is, for instance, zero.

Flags field 304: This field contains information about the TCW. Example flags include but are not limited to an input transport indirect addressing flag for indicating whether the input data address field 314 contains the absolute address of the input location or the absolute address of a TIDAL, such as TIDAL 208 of FIG. 2; a TCCB indirect data address flag for indicating whether the TCCB address field 318 contains the absolute address of the transport indirect data address word or a list of transport indirect data address words that designate the location or locations, respectively, of the transport control block for the transport control word; and an output transport indirect addressing flag for indicating whether the output data address field 312 contains the absolute address of the output location or the absolute address of a TIDAL, such as TIDAL 208 of FIG. 2.

TCCB Length (TCCBL) field 306: This field specifies an unsigned integer whose value, when added to a select value (e.g., 20) for unidirectional data transfers or when added to another value (e.g., 24) for bidirectional data transfers, specifies the length of the transfer command control block in bytes.

Read Operations (R) field 308: When this field is one, the input count field 322 is valid and contains a non-zero value, indicating the number of bytes to be transferred into main storage.

Write Operations (W) field 310: When this field is one, the output count field 320 is valid and contains a non-zero value, indicating the number of bytes to be transferred from main storage.

Output Data Address field 312: When the write operations field 310 is one and the output transport indirect data addressing flag of the flags field 304 is zero, this field designates a 64-bit output location in, e.g., absolute storage. When the write operations field 310 is one and the output transport indirect data address flag of the flags field is one, this field designates a 64-bit location in, e.g., absolute storage of a transport indirect data address word or list of transport indirect data address words that designate the output storage location or locations.

Input Data Address field 314: When the read operations field 310 is one and the input transport indirect data addressing flag of the flags field 304 is zero, this field designates a 64-bit input location in, e.g., absolute storage. When the read operations field 308 is one and the input transport indirect data addressing of the flags field is one, this field designates the 64-bit location in, e.g., absolute storage of a transport indirect data address word or list of transport indirect data address words that designate the input storage location or locations.

TSB Address field 316: This field designates a 64-bit location in, e.g., absolute storage of a TSB, such as TSB 204 of FIG. 2 for the TCW 300.

TCCB Address field 318: If the TCCB transport indirect data address flag in the flags field 304 is zero, this field designates a 64-bit location in, e.g., absolute storage of the TCCB, such as TCCB 206 of FIG. 2. When the TCCB transport indirect data address field is zero, the TCCB is specified to reside in a contiguous area of storage. If the TCCB transport indirect data address field is one, this field designates a 64-bit location in, e.g., absolute storage of a TIDAL, such as TIDAL 208 of FIG. 2, that designate the location in absolute storage of the TCCB. When the TCCB indirect data address flag in the flags field 304 is one, the TCCB may be specified to reside in a non-contiguous area of storage.

Output Count field 320: When the write operations field 310 is one, this field includes an unsigned integer total count of output bytes for the TCW.

Input Count field 322: When the read operations field 308 is one, this field contains an unsigned integer total count of input bytes for the transport control word.

Mirror Indicator field 324: This field includes, in accordance with one or more embodiments of the present invention, an indication of whether port mirroring should be performed, and if mirroring is to be performed, whether the mirroring is on inbound data or outbound data. In accordance with one or more embodiments of the present invention, when the value of the field is "0001" inbound port mirroring is to be performed, and when the value of the field is "1001" outbound port mirroring is to be performed. The port that the Mirror Indicator field 324 and Mirror Type field 326 refer to is a port in an HBA, such as HBA 130 of FIG. 1, specified, or selected, by the I/O processor, such as I/O processor 120 of FIG. 1, for driving the data transfer described by the TCW.

Mirror Type field 326: This field indicates, in accordance with one or more embodiments of the present invention, a specific sub-type of the mirroring to apply for the specific mirroring operation. For instance, if the type field indicates inbound mirroring, then this field indicates a specific type of the inbound mirroring to be applied.

When the mirror indicator field 324 indicates inbound mirroring, the following mirror type field 326 values can be implemented in accordance with one or more embodiments of the present invention: "0000"—inbound physical mirror clear/reset to stop the physical mirroring (i.e., copying or mirroring of data to another physical port of the HBA) of data received at the port; "0010"—inbound physical mirror one-time mirror to perform physical mirroring of data received at the port for just the current TCW being processed; "0011"—inbound physical mirror for persistent mirror to perform physical mirroring of any subsequent data received on this channel, or port; "0100"—inbound virtual mirror clear/reset to stop the virtual mirroring (i.e., copying or mirroring of data to a location in memory, such as memory 115 of FIG. 1) of data received at the port; "0110"—inbound virtual mirror for one-time mirror to perform virtual mirroring of data received at the port for just the current TCW being processed; and "0111"—inbound virtual mirror for persistent mirror to perform virtual port mirroring of any subsequent data received on this channel, or port.

When the mirror indicator field 324 indicates outbound mirroring, the following mirror type field 326 values can be implemented in accordance with one or more embodiments of the present invention: "0000"—outbound physical mirror clear/reset to stop the physical mirroring (i.e., copying or mirroring of data to a physical port) of data sent out from the port; "0010"—outbound physical mirror one-time mirror to perform physical mirroring of data transmitted by the port for just the current TCW being processed; "0011"—outbound physical mirror for persistent mirror to perform physical mirroring of any subsequent data transmitted on this channel, or port; "0100"—outbound virtual mirror clear/reset to stop the virtual mirroring (i.e., copying or mirroring of data to a location in memory) of data transmitted by the port; "0110"—outbound virtual mirror for one-time mirror to perform virtual mirroring of data transmitted by the port just the current TCW being processed; and "0111"—outbound virtual mirror for persistent mirror to perform virtual port mirroring of any subsequent data transmitted on this channel, or port.

Status field (328): This field indicates, in accordance with an aspect of the present invention, a result of the mirroring, regardless of whether it is a success or a failure. In one example, this field indicates a status field offset pointer, which is a location of more information on what error, if any, occurred during mirroring.

Interrogate TCW Address field 330: This field is used to initiate an interrogate operation when appropriate.

Although specific fields, locations of fields, sizes of fields, bits and values of fields or bits are described in one embodiment herein for the TCW, other fields, locations of fields, sizes of fields, bits and/or values of fields or bits may be used without departing from a spirit of one or more aspects of the invention. Fields and/or sub-fields of each of the fields not described herein may be blank, have a predefined value (e.g., zero), and/or include values to be ignored in one embodiment. Further, the TCW may include additional, fewer and/or other fields or sub-fields of fields to be used in I/O processing.

In accordance with one or more embodiments of the present invention, a TCW is directed to a specific channel, or port, via an I/O processor, such as I/O processor 120 of FIG. 1. A linked TCW can be used by one or more embodiments of the present invention to trigger the port mirroring and to include the mirror indicator fields (e.g., mirror indicator field 324 and mirror type field 326). In accordance with one or more embodiments of the present a primary TCW has the field, subfield, and linked TCW address fields, and the linked TCW contains the mirror address (virtual) or channel ID (physical) along with any filtering information. The linked TCW's output data address field 312 and input data address field 314 can be used to specify the to and from ports for the mirroring function.

When the mirror indicator field 324 indicates outbound mirroring or inbound mirroring, the following mirror type field 326 values can be implemented in accordance with one or more embodiments of the present invention: "1000"—outbound and inbound physical mirror clear/reset to stop the physical mirroring (i.e., copying or mirroring of data to a physical port) of data send out from the port; "1010"—outbound and inbound physical mirror one-time packet mirror to perform physical mirroring of data transmitted by the port for the next packet transmitted by the port; "1011"—outbound and inbound physical mirror for persistent pocket mirror to perform physical mirroring of any subsequent data transmitted on this channel, or port; one-time packet mirror to cause data transmitted by the port to be physically mirrored for just the current TCW being processed; "1100"—outbound and inbound virtual mirror clear/reset to stop the virtual mirroring (i.e., copying or mirroring of data to a location in memory) of data transmitted by the port; "1110"—outbound and inbound virtual mirror for one-time packet mirror to perform virtual mirroring of data transmitted by the port for the next packet received at the port; and "1111"—outbound and inbound virtual mirror for persistent pocket mirror to perform virtual port mirroring of any subsequent data transmitted on this channel, or port.

Additional filtering fields can also be included in one or more embodiments of the TCW to collect a specific subset of the data. Additional filters can include, but are not limited to:

Protocol Type (R_CTL) filter to mirror only particular types data such as, but not limited to payload data or status data and/or commands.

Link Address Source filter to mirror only data from a specific source address (e.g., a specified port).

Link Address Destination filter to mirror only data being transmitted to a specific target address (e.g., a specified port).

Frame Size filter with one or both of a lower bound and an upper bound to mirror only frames of certain sizes. The filter can be less than, greater than, a specific size, and/or a range of valid sizes.

Payload Size filter to mirror only certain size payloads.

Data Truncation filter to limit the amount of data in a payload that is mirrored. The filter can specify mirroring only a fixed size/amount of data from the front of the packet or from the end of the packet, or the filter can specify mirroring only data of a specified size and/or position in the payload.

Destination Control Unit Device Type filter to filter based on the type of I/O device to only mirror data from particular types of I/O devices such as but not limited to tape device, DASD devices, flash storage, and channel-to-channel (CTC).

The above filters are exemplary in nature and one or more embodiments of the invention may implement additional filters for selecting the type and amount of data at a port to be being mirrored.

Figure 4:
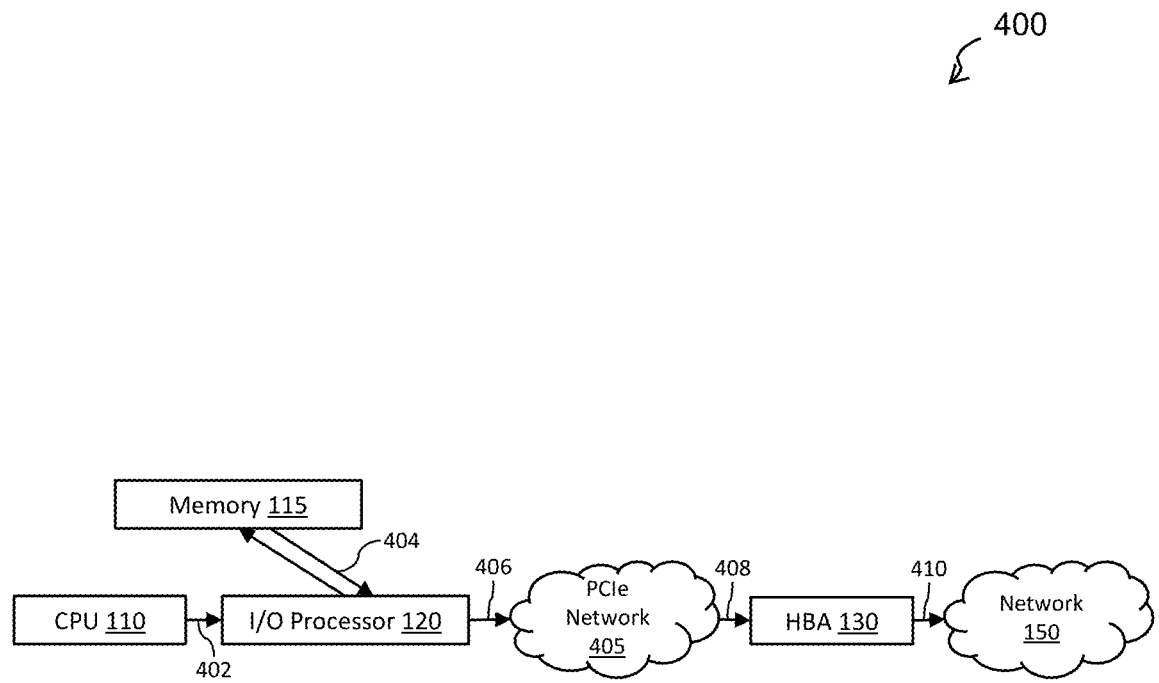
FIG. 4 depicts an outbound input/output (I/O) operation according to one or more embodiments of the present invention.

Turning now to FIG. 4, a block diagram 400 of a process for performing an outbound I/O operation is generally shown in accordance with one or more embodiments of the present invention. The embodiment shown in FIG. 4 includes the components of the server 105 of FIG. 1 and the network of FIG. 1 as well as a PCIe network 405 providing communication between the I/O processor 120 and the HBA 130 on the server 105. The PCIe network 405 may include switches and/or splitters.

The processing shown in FIG. 4 is performed if outbound mirroring has not been enabled (e.g., by the Mirror Indicator field 324 of TCW 300 of FIG. 3) on the port that is transmitting data to a link in the external network 150. As shown in FIG. 4, the CPU 110 sends 402 a TCW, such as TCW 300 of FIG. 3, to the I/O processor 120. The TCW includes instructions to transmit data to a target device, such as device 170 of FIG. 1, via the network 150. The I/O processor 120 fetches 404 the data from the memory 115, and the I/O processor 120 sends 406 the data (also referred to herein as "outbound data") to a port on the HBA 130 via the PCIe network 405. The data is received 408 at the HBA 130 and the HBA 130 packages the data and transmits 410 it via a port specified by the I/O processor 120 to a link in the external network 150 to a target device, such as device 170 of FIG. 1.

The processing shown in FIG. 4 is not intended to indicate that the operations are to be executed in any particular order, or that all of the operations shown in FIG. 4 are to be included in every case. Additionally, the processing shown in FIG. 4 can include any suitable number of additional operations.

Figure 5:
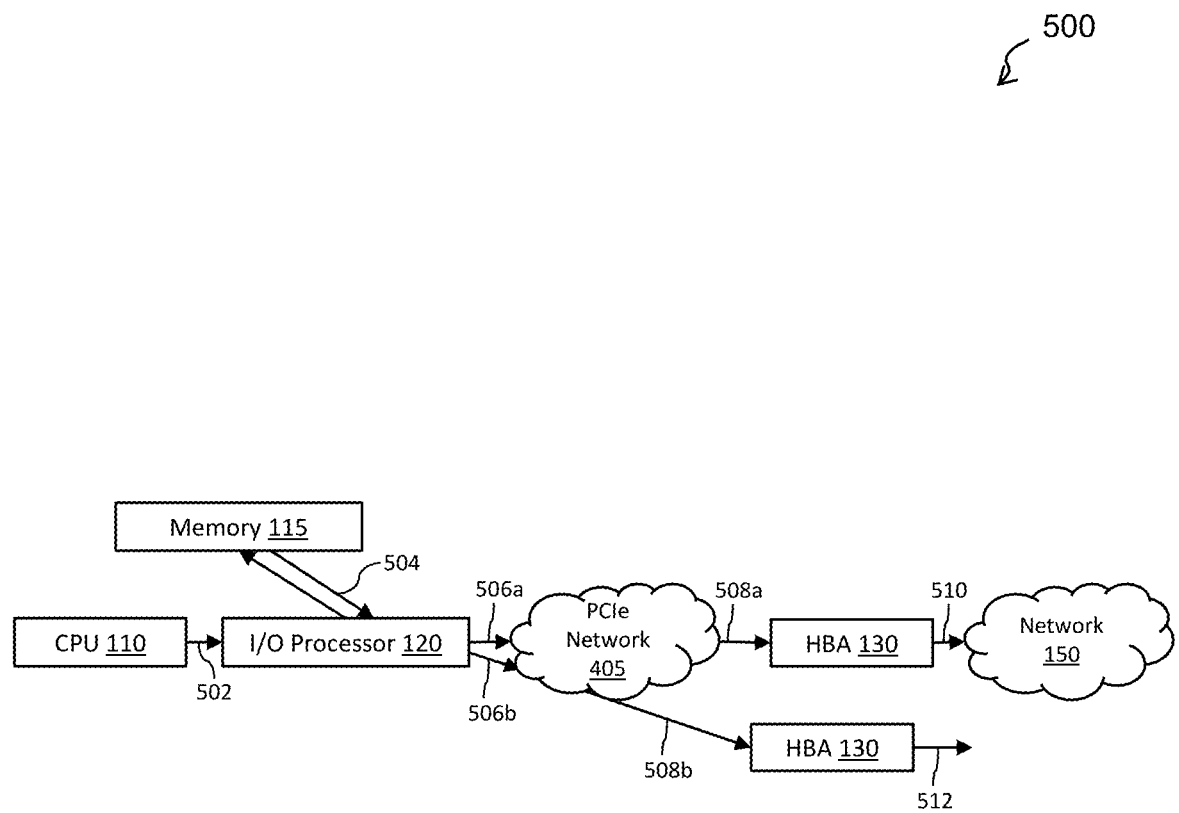
FIG. 5 depicts an outbound I/O operation that provides mirroring to a physical port according to one or more embodiments of the present invention.

Turning now to FIG. 5, a block diagram 500 of a process for performing an outbound I/O operation that provides mirroring to a physical port is generally shown in accordance with one or more embodiments of the present invention. The embodiment shown in FIG. 5 includes the components of the server 105 of FIG. 1 and the network of FIG. 1 as well as a PCIe network 405 providing communication between the I/O processor 120 and two of the HBAs 130 on the server 105.

The processing shown in FIG. 5 is performed if outbound physical mirroring has been enabled (e.g., by the Mirror Indicator field 324 and the Mirror Type field 326 of TCW 300 of FIG. 3) on the port that is transmitting data to a link in the external network 150. As shown in FIG. 5, the CPU 110 sends 502 a TCW, such as TCW 300 of FIG. 3, to the I/O processor 120. The TCW includes instructions to transmit data to a target device, such as device 170 of FIG. 1, via the network 150. In response to receiving (or retrieving) the TCW, the I/O processor 120 fetches 504 the data from the memory 115, and the I/O processor 120 sends 506a the data to a port on the HBA 130 via the PCIe network 405. The data is received 408a at the HBA 130 and the HBA 130 packages the data and transmits 510 it via a port specified by the I/O processor 120 to a link in the external network 150 to a target device (not shown), such as device 170 of FIG. 1.

In addition, because outbound physical mirroring has been enabled on the port that is transmitting data to a link on the external network 150, the I/O processor 120 also sends 506b a copy of the data to another port on another HBA 130 via the PCIe network 405. In accordance with one or more embodiments of the present invention, the sending 506a and 506b can be initiated at the same time or the sending 506b can be initiated close in time but subsequent to the sending 506a. The copy of the data is received 508b at the other port on the other HBA 130 and transmitted 512 to a second target device (not shown).

In one or more embodiments prior to the processing shown in FIG. 5, a linked TCW that contains instructions related to the mirroring and does not include any payload data to be transmitted is sent from the CPU 110 to the I/O processor 120. In these one or more embodiments, the TCW includes an identifier of the port to be mirrored and the port to perform the mirroring. The type of data being copied, or mirrored, and the duration of the mirroring can be specified using the Mirror Type field 326 of the TCW as well as additional filters specified in the TCW. In accordance with one or more embodiments of the present invention, the mirroring described in FIG. 5 is performed based on contents of the linked TCW received prior to the I/O processor 120 receiving the TCW containing or specifying the data to be transmitted to the target device via the external network 150.

In one or more embodiments of the present invention, the port performing the mirroring and the port being mirrored are located on the same HBA 130.

The processing shown in FIG. 5 is not intended to indicate that the operations are to be executed in any particular order, or that all of the operations shown in FIG. 5 are to be included in every case. Additionally, the processing shown in FIG. 5 can include any suitable number of additional operations.

Figure 6:
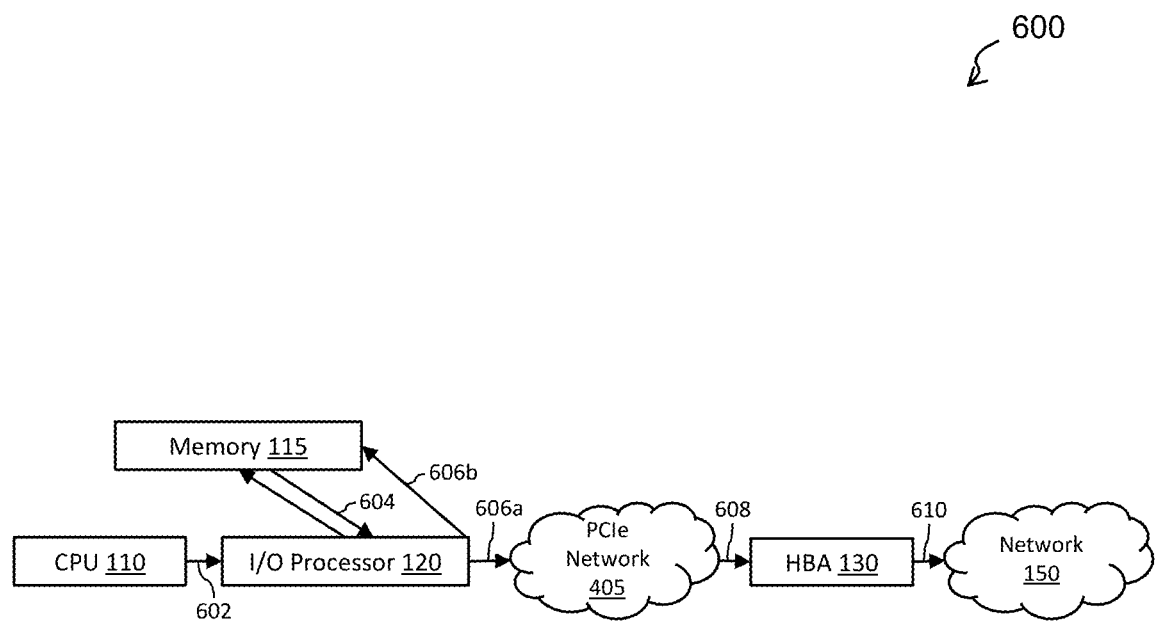
FIG. 6 depicts an outbound I/O operation that provides mirroring to a virtual port according to one or more embodiments of the present invention.

Turning now to FIG. 6, a block diagram 600 of performing an outbound I/O operation that provides mirroring to a virtual port is generally shown in accordance with one or more embodiments of the present invention. The embodiment shown in FIG. 6 includes the components of the server 105 of FIG. 1 and the network of FIG. 1 as well as a PCIe network 405 providing communication between the I/O processor 120 and an HBA 130 on the server 105.

The processing shown in FIG. 6 is performed if outbound virtual mirroring has been enabled (e.g., by the Mirror Indicator field 324 and the Mirror Type field 326 of TCW 300 of FIG. 3) on the port that is transmitting data to a link in the external network 150. As shown in FIG. 6, the CPU 110 sends 602 a TCW, such as TCW 300 of FIG. 3, to the I/O processor 120. The TCW includes instructions to transmit data to a target device, such as device 170 of FIG. 1, via the network 150. In response to receiving (or retrieving) the TCW, the I/O processor 120 fetches 604 the data from the memory 115, and the I/O processor 120 sends 606a the data to a port on the HBA 130 via the PCIe network 405. The data is received 608 at the HBA 130 and the HBA 130 packages the data and transmits 610 it via a port specified by the I/O processor 120 to a link in the external network 150 to a target device (not shown), such as device 170 of FIG. 1.

In addition, because outbound virtual mirroring has been enabled on the port that is transmitting data to a link on the external network 150, the I/O processor 120 also sends 606b a copy of the data to a second location in the memory 115 (different than the memory location where the data was fetched from). This second location in the memory is referred to herein as the "virtual port." In accordance with one or more embodiments of the present invention, the sending 606a and 606b can be initiated at the same time or the sending 606b can be initiated close in time but subsequent to the sending 606a. The copy of the data is stored in the memory 115 can be reviewed or inspected for the purposes of problem debug or saved for redundancy In one or more embodiments prior to the processing shown in FIG. 6, a linked TCW that contains instructions related to the mirroring and does not include any payload data to be transmitted is sent from the CPU 110 to the I/O processor 120. In these one or more embodiments, the linked TCW includes the address of the virtual port in the memory 115. The type of data being copied, or mirrored, and the duration of the mirroring can be specified using the Mirror Type field 326 of the TCW as well as additional filters specified in the linked TCW. In accordance with one or more embodiments of the present invention, the mirroring described in FIG. 6 is performed based on contents of the linked TCW received prior to the I/O processor 120 receiving the TCW containing or specifying the data to be transmitted to the target device via the external network 150.

The processing shown in FIG. 6 is not intended to indicate that the operations are to be executed in any particular order, or that all of the operations shown in FIG. 6 are to be included in every case. Additionally, the processing shown in FIG. 6 can include any suitable number of additional operations.

Figure 7:
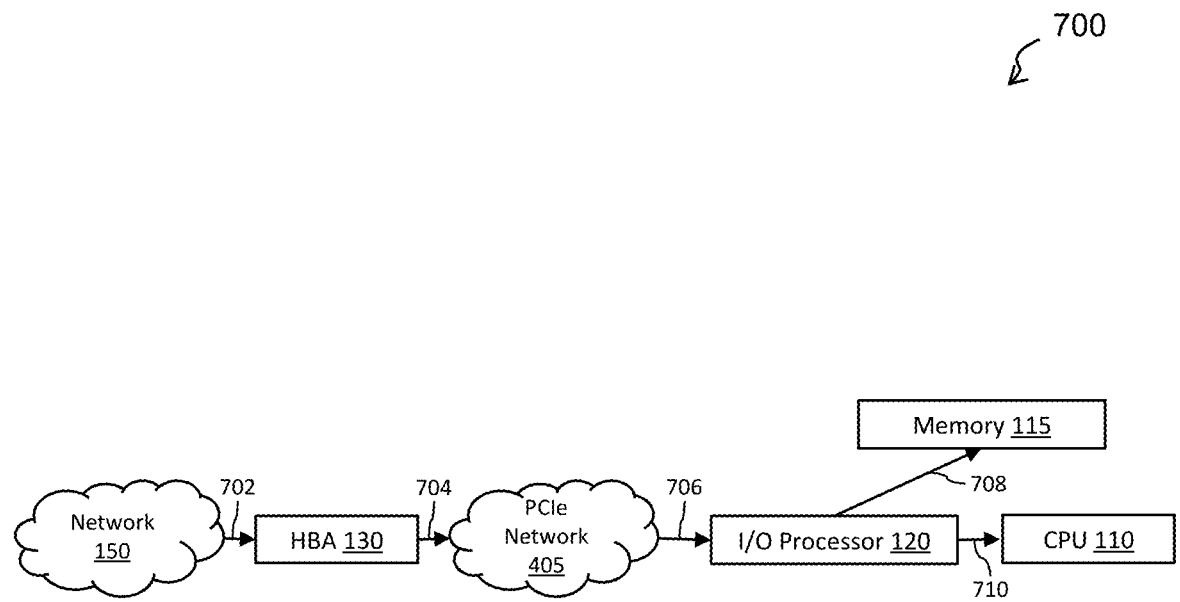
FIG. 7 depicts an inbound I/O operation according to one or more embodiments of the present invention.

Turning now to FIG. 7, a block diagram 700 of a process for performing an inbound I/O operation is generally shown in accordance with one or more embodiments of the present invention. The embodiment shown in FIG. 7 includes the components of the server 105 of FIG. 1 and the network of FIG. 1 as well as a PCIe network 405 providing communication between the I/O processor 120 and the HBA 130 on the server 105.

The processing shown in FIG. 7 is performed if inbound mirroring has not been enabled (e.g., by the Mirror Indicator field 324 of TCW 300 of FIG. 3) on the port that is receiving data from a link in the external network 150. As shown in FIG. 7, a data packet is received 702 at a port on the HBA 130. The HBA 130 removes the framing metadata associated with the data packet and sends 704 the data (also referred to herein as "inbound data") to the I/O processor 120 via the PCIe network 405. The data is received 706 at the I/O processor 120 and the I/O processor 120 stores 708 the inbound data in the memory 115. As shown in FIG. 7, the I/O processor 120 notifies 710 the CPU 110 that the inbound data is stored in the memory.

The processing shown in FIG. 7 is not intended to indicate that the operations are to be executed in any particular order, or that all of the operations shown in FIG. 7 are to be included in every case. Additionally, the processing shown in FIG. 7 can include any suitable number of additional operations.

Figure 8:
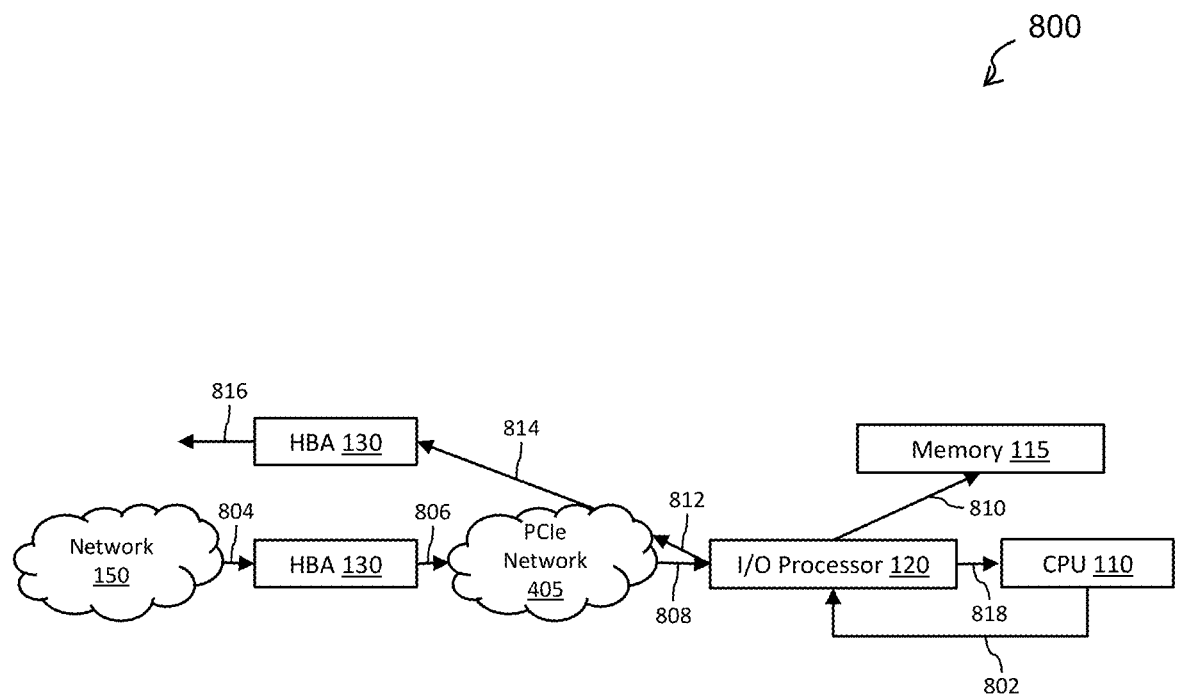
FIG. 8 depicts an inbound I/O operation that provides mirroring to a physical port according to one or more embodiments of the present invention.

Turning now to FIG. 8, a block diagram 800 of a process for performing an inbound I/O operation that provides mirroring to a physical port is generally shown in accordance with one or more embodiments of the present invention. The embodiment shown in FIG. 8 includes the components of the server 105 of FIG. 1 and the network of FIG. 1 as well as a PCIe network 405 providing communication between the I/O processor 120 and two of the HBAs 130 on the server 105.

The processing shown in FIG. 8 is performed if inbound physical mirroring has been enabled (e.g., by the Mirror Indicator field 324 and the Mirror Type field 326 of TCW 300 of FIG. 3) on the port that is receiving the data from the link in the external network 150. In one or more embodiments of the present invention, a TCW (e.g., a linked TCW) that contains instructions related to the mirroring is sent 802 from the CPU 110 to the I/O processor 120. In these one or more embodiments, the TCW includes an identifier of the port to be mirrored and the port to perform the mirroring, or to be mirrored to. The type of data being copied, or mirrored, and the duration of the mirroring can be specified using the Mirror Type field 326 of the TCW as well as additional filters specified in the TCW. In accordance with one or more embodiments of the present invention, the mirroring described in FIG. 8 is performed based on contents of the linked TCW received prior to the I/O processor 120 receiving the inbound data from the external network 150.

As shown in FIG. 8, a data packet is received 804 at a port on the HBA 130. The HBA 130 removes the framing metadata associated with the data packet and sends 806 the data (also referred to herein as "inbound data") to the I/O processor 120 via the PCIe network 405. The data is received 808 at the I/O processor 120 and the I/O processor 120 stores 810 the data to a memory array in the memory 115. As shown in FIG. 8, the I/O processor 120 notifies 818 the CPU 110 that the inbound data is stored in the memory and may also notify the CPU 110 about the mirrored data.

In addition, because inbound physical mirroring has been enabled on the port that the data was received on, the I/O processor 120 also sends 812 a copy of the data to another physical port on another HBA 130 via the PCIe network 405. The copy of the inbound data is received 814 by the other HBA 130 and transmitted 816 to a target device (not shown).

In one or more embodiments of the present invention, the port performing the mirroring and the port receiving the inbound data can be located on the same HBA 130.

The processing shown in FIG. 8 is not intended to indicate that the operations are to be executed in any particular order, or that all of the operations shown in FIG. 8 are to be included in every case. Additionally, the processing shown in FIG. 8 can include any suitable number of additional operations.

Figure 9:
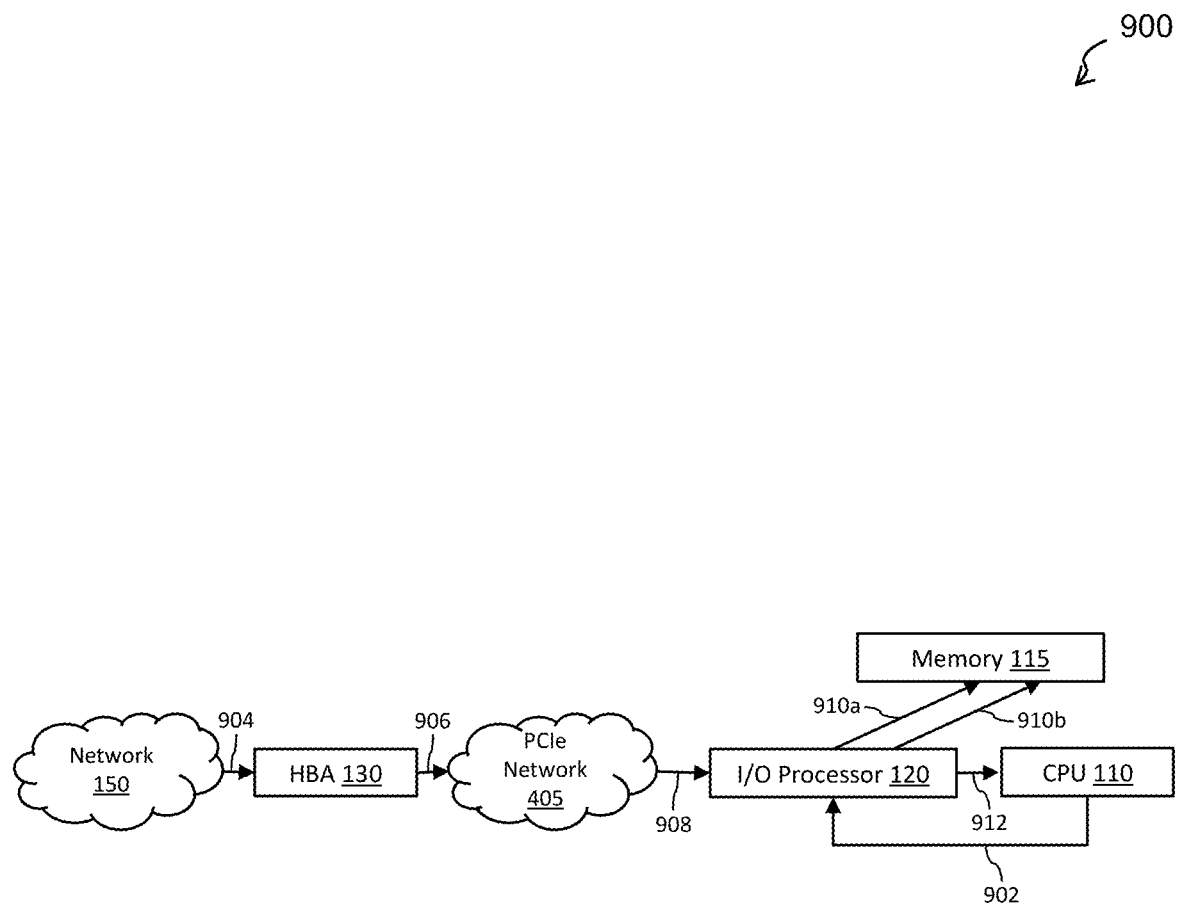
FIG. 9 depicts an inbound I/O operation that provides mirroring to a virtual port according to one or more embodiments of the present invention.

Turning now to FIG. 9, a block diagram 900 of performing an inbound I/O operation that provides mirroring to a virtual port is generally shown in accordance with one or more embodiments of the present invention. The embodiment shown in FIG. 9 includes the components of the server 105 of FIG. 1 and the network of FIG. 1 as well as a PCIe network 405 providing communication between the I/O processor 120 and an HBA 130 on the server 105.

The processing shown in FIG. 9 is performed if inbound virtual mirroring has been enabled (e.g., by the Mirror Indicator field 324 and the Mirror Type field 326 of TCW 300 of FIG. 3) on the port that is receiving inbound data from a link in the external network 150. As shown in FIG. 9, a data packet is received 904 at a port on the HBA 130. The HBA 130 removes the framing metadata associated with the data packet and sends 906 the data (also referred to herein as "inbound data") to the I/O processor 120 via the PCIe network 405. The data is received 908 at the I/O processor 120 and the I/O processor 120 stores 910a the data in a memory array in the memory 115. As shown in FIG. 8, the I/O processor 120 notifies 818 the CPU 110 that the inbound data is stored in the memory and may also notify the CPU 110 about the mirrored data at the virtual port.

In addition, because inbound virtual mirroring has been enabled on the port that the data was received on, the I/O processor 120 also stores 910b a copy of the data to a second memory location (virtual port) in the memory 115.

The processing shown in FIG. 9 is not intended to indicate that the operations are to be executed in any particular order, or that all of the operations shown in FIG. 9 are to be included in every case. Additionally, the processing shown in FIG. 9 can include any suitable number of additional operations.

Figure 10:
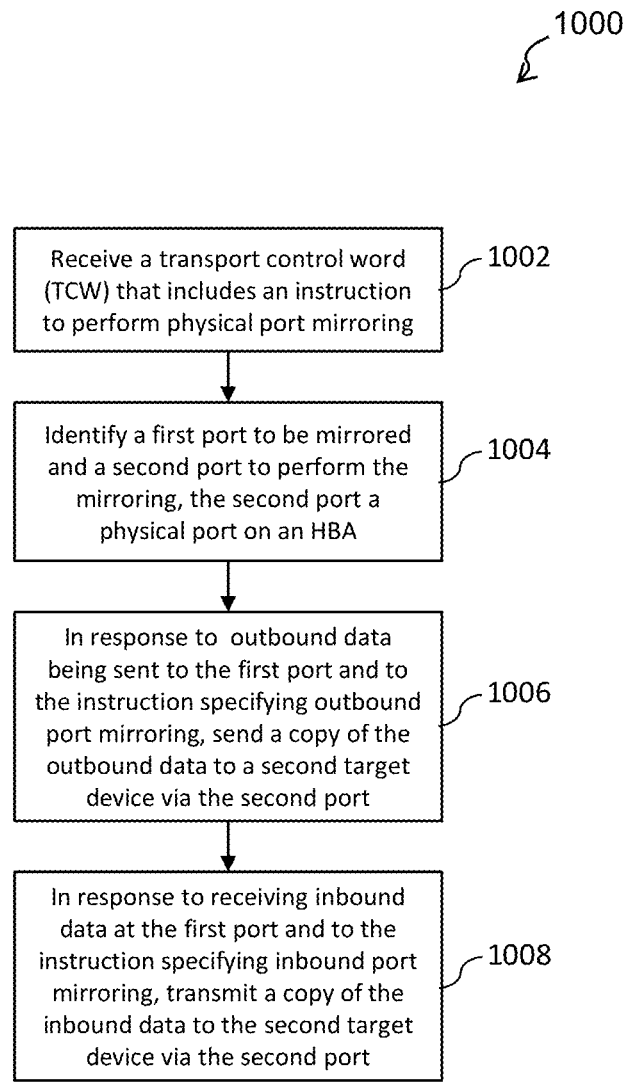
FIG. 10 depicts a flow diagram of a method for providing physical port mirroring according to one or more embodiments of the present invention.

Turning now to FIG. 10, a flow diagram of a method 1000 for providing physical port mirroring is generally shown in accordance with one or more embodiments of the present invention. All or a portion of the processing shown in FIG. 10 can be performed by an I/O processor, such as I/O processor 120 of FIG. 1. At block 1002, a TCW that includes an instruction to perform physical port mirroring is received. The TCW may be a linked TCW or a TCW that also specifies an I/O operation to be performed by the I/O processor. The TCW may be received from an operating system executing on a processor, such as CPU 110 of FIG. 1. The instruction may indicate that the physical port mirroring should be performed for a plurality of outbound or inbound transmissions on the port (e.g., until a new mirroring instruction for the port is received or for a specified time frame or a specified number of transmissions), or alternatively the instruction may indicate that mirroring should be performed for just a single transmission on the port. At block 1004, a first port to be mirrored and a second port to perform the mirroring are identified based, for example on contents of the TCW.

At block 1006, in response to outbound data being sent to the first port and to the instruction specifying outbound port mirroring, a copy of the outbound data is sent to a second target device via the second port. In accordance with one or more embodiments of the present invention the copy of the outbound data can include all or only a portion (a proper subset) of the outbound data sent to the first port. Contents of the copy of the outbound data can be determined based on settings in the Mirror Indicator field 324 and the Mirror Type field 326 of a TCW 300 and/or based on filters as described previously. In accordance with one or more embodiments of the present invention, the I/O processor receives an instruction (e.g., from an OS executing on a CPU) to send the outbound data to the first target device. In response to receiving the instruction, the I/O processor fetches the outbound data from a memory and sends the outbound data to the first port for transmission to the first target device.

At block 1008, in response to receiving inbound data at the first port and to the instruction specifying inbound port mirroring, a copy of the inbound data is transmitted to the second target device via the second port. In accordance with one or more embodiments of the present invention the copy of the inbound data transmitted to the second target device can include all or only a portion (a proper subset) of the inbound data received at the first port. Contents of the copy of the inbound data can be determined based on settings in the Mirror Indicator field 324 and the Mirror Type field 326 of a TCW 300 and/or based on filters as described previously. In accordance with one or more embodiments of the present invention, the I/O processor receives inbound data from the first port and stores the inbound data into a memory (e.g., for access by the CPU).

The processing shown in FIG. 10 is not intended to indicate that the operations are to be executed in any particular order, or that all of the operations shown in FIG. 10 are to be included in every case. Additionally, the processing shown in FIG. 10 can include any suitable number of additional operations.

Figure 11:
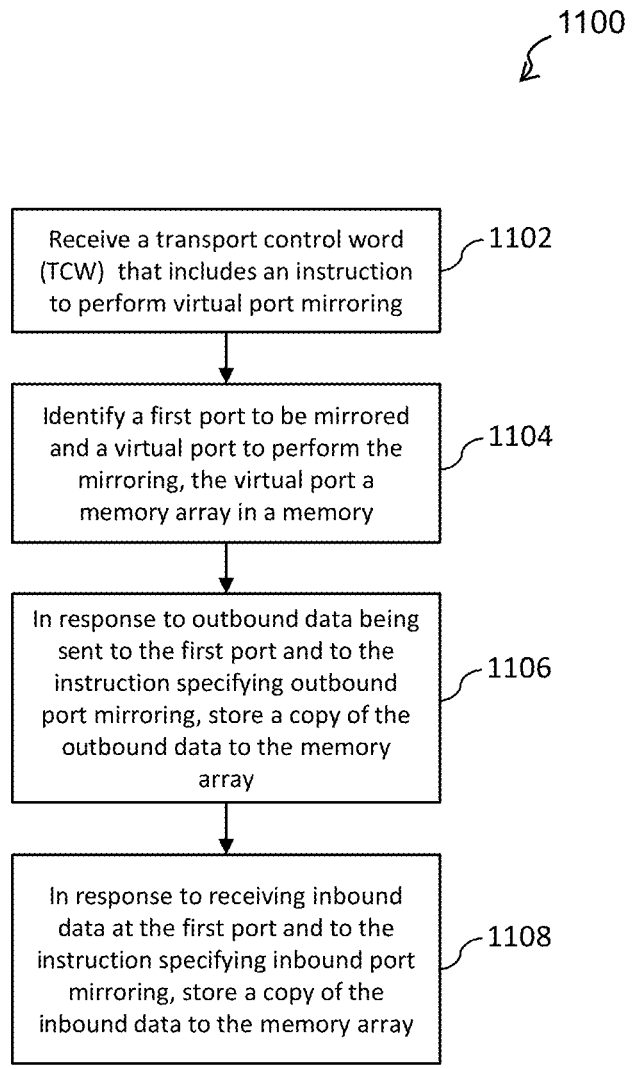
FIG. 11 depicts a flow diagram of a method for providing virtual port mirroring according to one or more embodiments of the present invention.

Turning now to FIG. 11, a flow diagram of a method 1100 for providing virtual port mirroring is generally shown in accordance with one or more embodiments of the present invention. All or a portion of the processing shown in FIG. 11 can be performed by an I/O processor, such as I/O processor 120 of FIG. 1. At block 1102, a TCW that includes an instruction to perform virtual port mirroring is received. The TCW may be a linked TCW or a TCW that also specifies an I/O operation to be performed by the I/O processor. The TCW may be received from an operating system executing on a processor, such as CPU 110 of FIG. 1. The instruction may indicate that the virtual port mirroring should be performed for a plurality of outbound or inbound transmissions on the port (e.g., until a new mirroring instruction for the port is received or for a specified time frame or a specified number of transmissions), or alternatively the instruction may indicate that mirroring should be performed for just a single transmission on the port.

At block 1104, a first port to be mirrored and a second virtual port (e.g., a memory location or memory array) to perform the mirroring are identified based, for example on contents of the TCW. At block 1106, in response to outbound data being sent to the first port and to the instruction specifying outbound port mirroring, a copy of the outbound data is stored to the memory location of the virtual port. In accordance with one or more embodiments of the present invention the copy of the outbound data can include all or only a portion (a proper subset) of the outbound data sent to the first port. Contents of the copy of the outbound data can be determined based on settings in the Mirror Indicator field 324 and the Mirror Type field 326 of a TCW 300 and/or based on filters as described previously. In accordance with one or more embodiments of the present invention, the I/O processor receives an instruction (e.g., from an OS executing on a CPU) to send the outbound data to the first target device. In response to receive the instruction, the I/O processor fetches the outbound data from a memory and sends the outbound data to the first port for transmission to the first target device.

At block 1108, in response to receiving inbound data at the first port and to the instruction specifying inbound port mirroring, a copy of the inbound data is stored in the memory location of the virtual port. In accordance with one or more embodiments of the present invention the copy of the inbound data transmitted to the second target device can include all or only a portion (a proper subset) of the inbound data received at the first port. In accordance with one or more embodiments of the present invention, the I/O processor receives inbound data from the first port and stores the inbound data into a memory (e.g., for access by the CPU).

The processing shown in FIG. 11 is not intended to indicate that the operations are to be executed in any particular order, or that all of the operations shown in FIG. 11 are to be included in every case. Additionally, the processing shown in FIG. 12 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
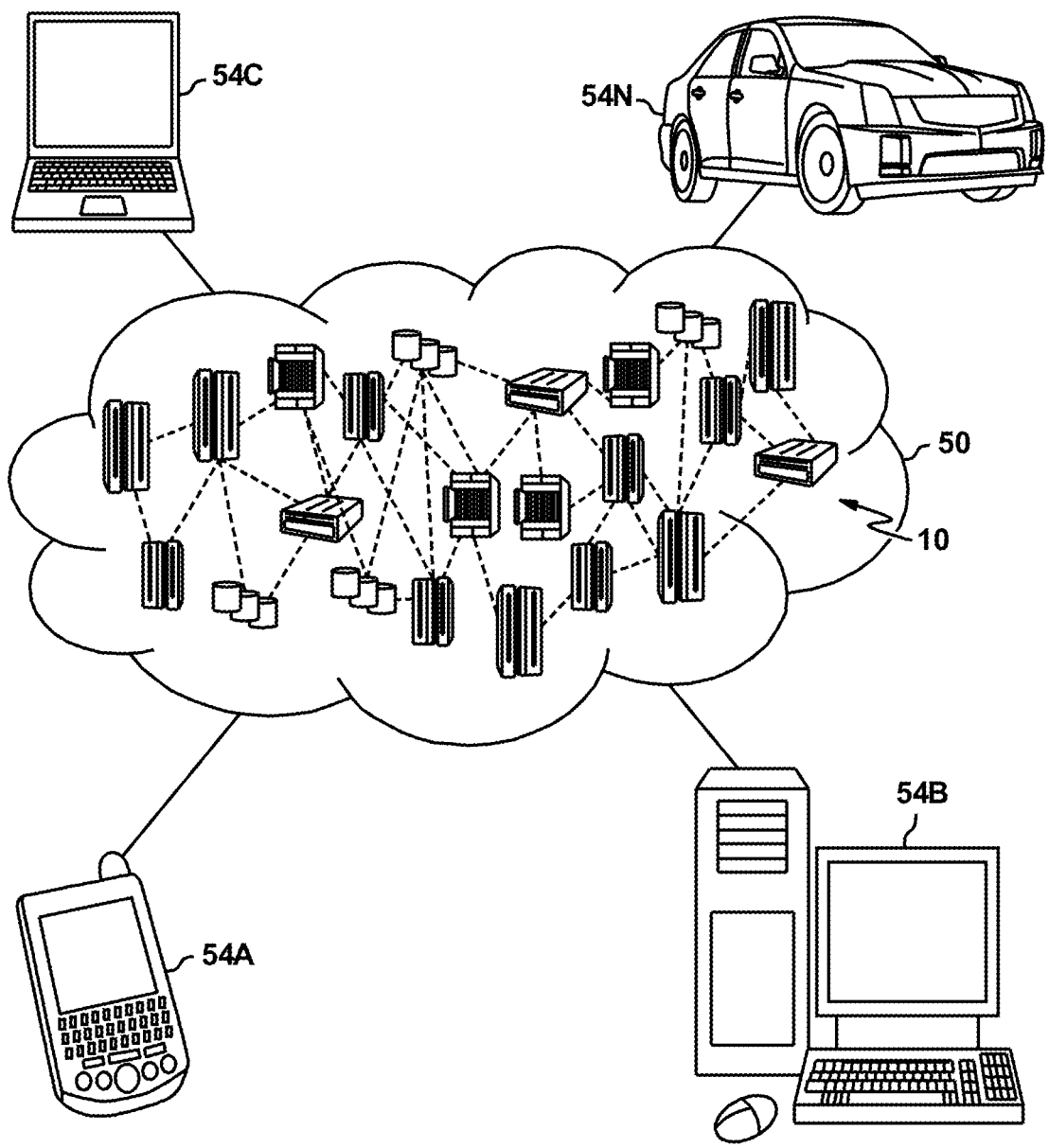
FIG. 12 depicts a cloud computing environment according to one or more embodiments of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
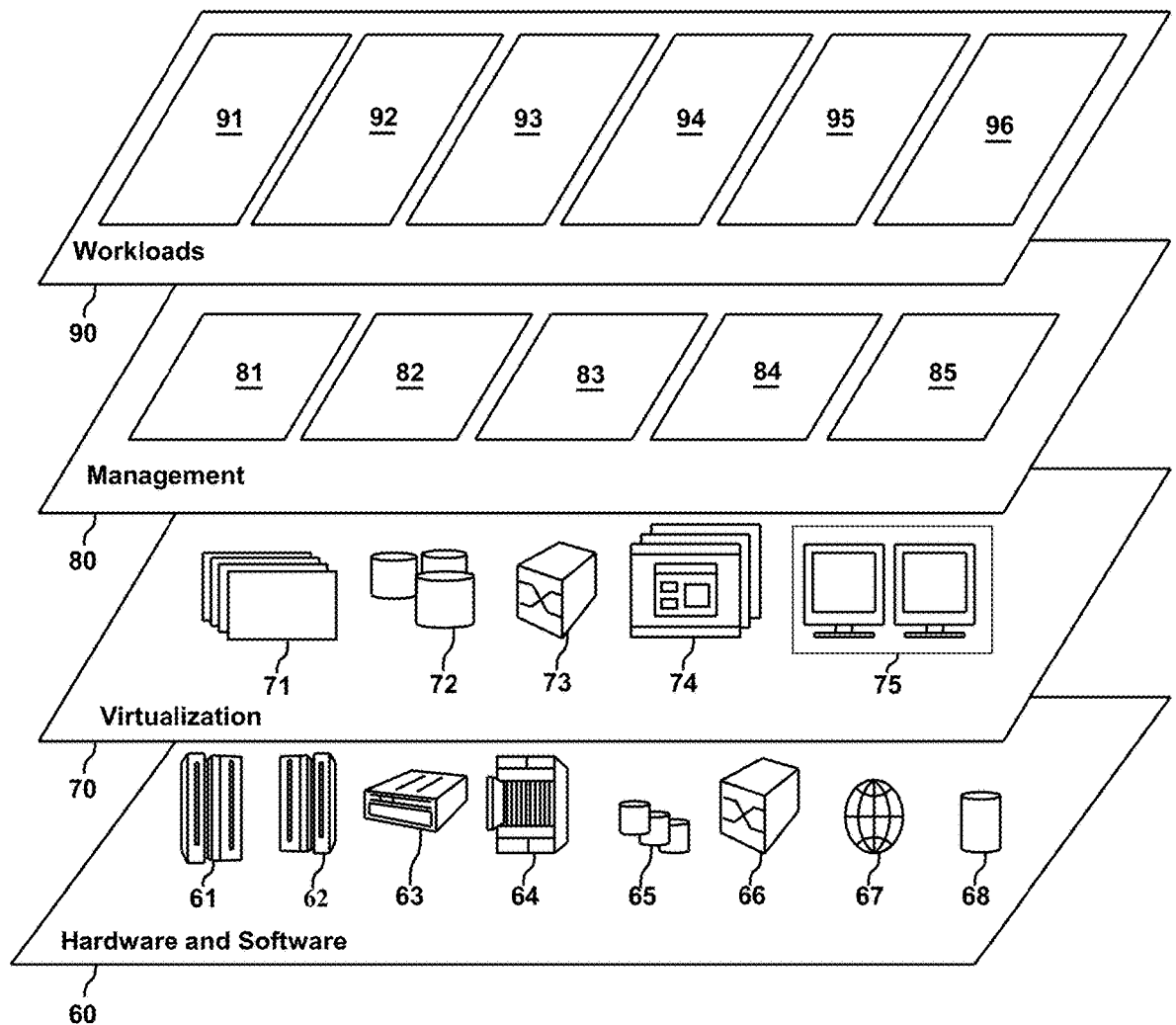
FIG. 13 depicts abstraction model layers according to one or more embodiments of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data encryption/decryption 96.

It is understood that one or more embodiments of the present invention are capable of being implemented in conjunction with any type of computing environment now known or later developed.

Figure 14:
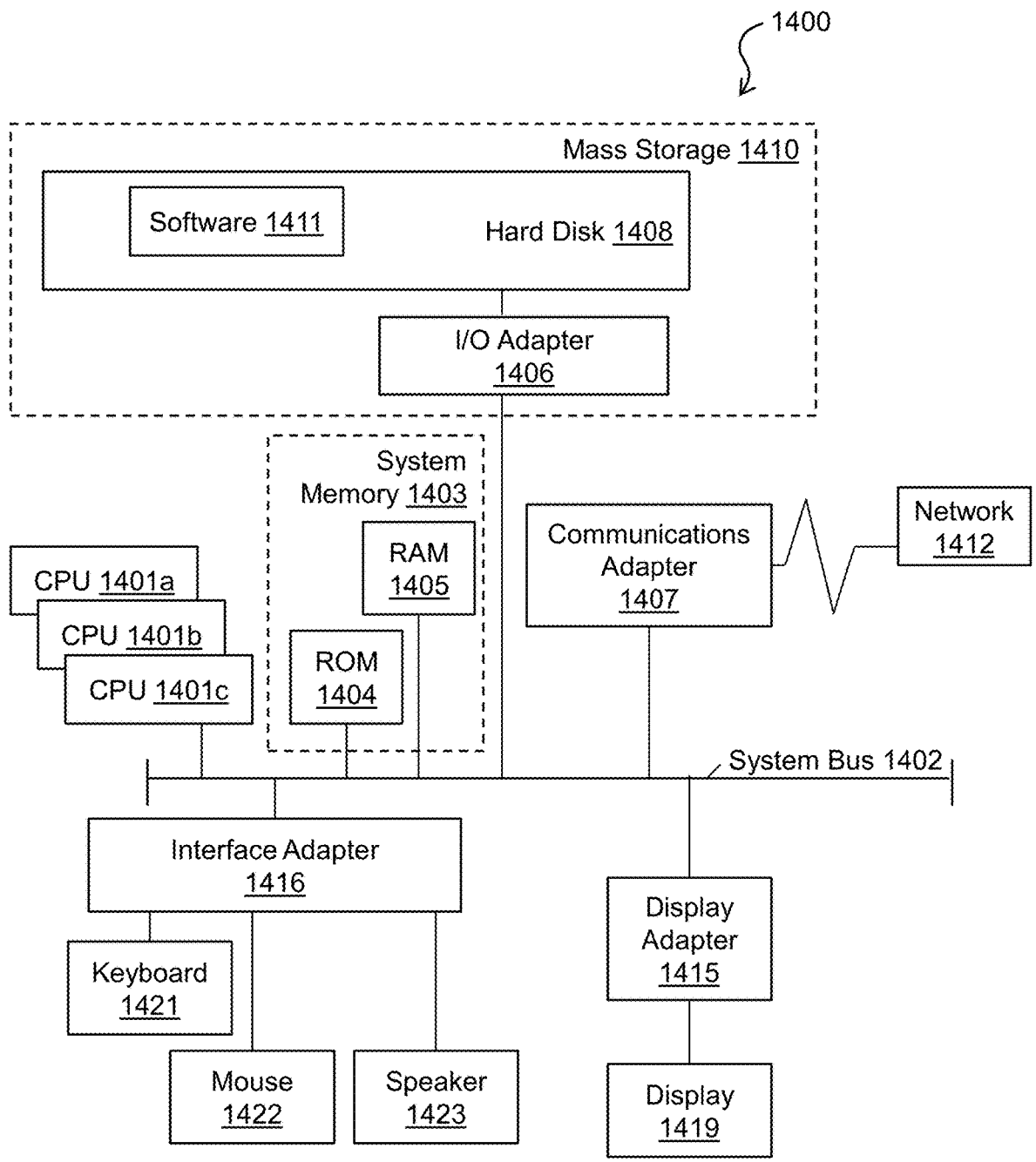
FIG. 14 illustrates a system for performing port mirroring according to one or more embodiments of the present invention.

Turning now to FIG. 14, a computer system 1400 is generally shown in accordance with an embodiment. All or a portion of the computer system 1400 shown in FIG. 14 can be implemented by one or more cloud computing nodes 10 of FIG. 12. The computer system 1400 can be an electronic, computer framework comprising and/or employing any number and combination of computing devices and networks utilizing various communication technologies, as described herein. The computer system 1400 can be easily scalable, extensible, and modular, with the ability to change to different services or reconfigure some features independently of others. The computer system 1400 may be, for example, a server, desktop computer, laptop computer, tablet computer, or smartphone. In some examples, computer system 1400 may be a cloud computing node. Computer system 1400 may be described in the general context of computer system executable instructions, such as program modules, being executed by a computer system. Generally, program modules may include routines, programs, objects, components, logic, data structures, and so on that perform particular tasks or implement particular abstract data types. Computer system 1400 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, the computer system 1400 has one or more central processing units (CPU(s)) 1401a, 1401b, 1401c, etc. (collectively or generically referred to as processor(s) 1401). The processors 1401 can be a single-core processor, multi-core processor, computing cluster, or any number of other configurations. The processors 1401, also referred to as processing circuits, are coupled via a system bus 1402 to a system memory 1403 and various other components. The system memory 1403 can include a read only memory (ROM) 1404 and a random access memory (RAM) 1405. The ROM 1404 is coupled to the system bus 1402 and may include a basic input/output system (BIOS), which controls certain basic functions of the computer system 1400. The RAM is read-write memory coupled to the system bus 1402 for use by the processors 1401. The system memory 1403 provides temporary memory space for operations of said instructions during operation. The system memory 1403 can include random access memory (RAM), read only memory, flash memory, or any other suitable memory systems.

The computer system 1400 comprises an input/output (I/O) adapter 1406 and a communications adapter 1407 coupled to the system bus 1402. The I/O adapter 1406 may be a serial advanced technology attachment (SATA) adapter that communicates with a hard disk 1408 and/or any other similar component. The I/O adapter 1406 and the hard disk 1408 are collectively referred to herein as a mass storage 1410.

Software 1411 for execution on the computer system 1400 may be stored in the mass storage 1410. The mass storage 1410 is an example of a tangible storage medium readable by the processors 1401, where the software 1411 is stored as instructions for execution by the processors 1401 to cause the computer system 1400 to operate, such as is described herein with respect to the various Figures. Examples of computer program product and the execution of such instruction is discussed herein in more detail. The communications adapter 1407 interconnects the system bus 1402 with a network 1412, which may be an outside network, enabling the computer system 1400 to communicate with other such systems. In one embodiment, a portion of the system memory 1403 and the mass storage 1410 collectively store an operating system, which may be any appropriate operating system, such as the z/OS® or AIX® operating system, to coordinate the functions of the various components shown in FIG. 14.

Additional input/output devices are shown as connected to the system bus 1402 via a display adapter 1415 and an interface adapter 1416 and. In one embodiment, the adapters 1406, 1407, 1415, and 1416 may be connected to one or more I/O buses that are connected to the system bus 1402 via an intermediate bus bridge (not shown). A display 1419 (e.g., a screen or a display monitor) is connected to the system bus 1402 by a display adapter 1415, which may include a graphics controller to improve the performance of graphics intensive applications and a video controller. A keyboard 1421, a mouse 1422, a speaker 1423, etc. can be interconnected to the system bus 1402 via the interface adapter 1416, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 14, the computer system 1400 includes processing capability in the form of the processors 1401, and storage capability including the system memory 1403 and the mass storage 1410, input means such as the keyboard 1421 and the mouse 1422, and output capability including the speaker 1423 and the display 1419.

In some embodiments, the communications adapter 1407 can transmit data using any suitable interface or protocol, such as the internet small computer system interface, among others. The network 1412 may be a cellular network, a radio network, a wide area network (WAN), a local area network (LAN), or the Internet, among others. An external computing device may connect to the computer system 1400 through the network 1412. In some examples, an external computing device may be an external webserver or a cloud computing node.

It is to be understood that the block diagram of FIG. 14 is not intended to indicate that the computer system 1400 is to include all of the components shown in FIG. 14. Rather, the computer system 1400 can include any appropriate fewer or additional components not illustrated in FIG. 14 (e.g., additional memory components, embedded controllers, modules, additional network interfaces, etc.). Further, the embodiments described herein with respect to computer system 1400 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram, or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk drive (HDD), a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
    receiving, at an input/output (I/O) processor, a transport control word (TCW) that includes an instruction to perform physical port mirroring;
    identifying, by the I/O processor based on a mirror indicator field and a mirror type field of the TCW, a first port to be mirrored and a second port to perform the mirroring, the second port a physical port on a host bus adapter (HBA);
    in response to outbound data being sent to the first port for transmission to a first target device and based the mirror indicator field specifying outbound port mirroring, sending, by the I/O processor, a copy of the outbound data to a second target device via the second port; and
    in response to receiving inbound data at the first port and based on the mirror indicator field specifying inbound port mirroring, transmitting a copy of the inbound data to the second target device via the second port,
    wherein the mirror type field of the TCW indicates a specific sub-type of mirroring for the I/O processor to perform.

2. The method of claim 1, further comprising:
    receiving, by the I/O processor, an instruction to send the outbound data to the first target device;
    fetching, by the I/O processor, the outbound data from a memory; and
    sending, by the I/O processor, the outbound data to the first port.

3. The method of claim 1, further comprising:
    receiving, by the I/O processor, the inbound data from the first port; and
    storing, by the I/O processor, the inbound data into a memory.

4. The method of claim 1, wherein the copy of the outbound data sent to the second target device is a subset of the outbound data.

5. The method of claim 1, wherein the copy of the inbound data sent to the second target device is a subset of the inbound data.

6. The method of claim 1, wherein the instruction causes port mirroring to be performed for a plurality of outbound data transmissions on the first port.

7. The method of claim 1, wherein the instruction causes port mirroring to be performed for a single outbound data transmission on the first port.

8. A system comprising:
    one or more processors for executing computer readable instructions, the computer readable instructions controlling the one or more processors to perform operations comprising:
        receiving a transport control word (TCW) that includes an instruction to perform physical port mirroring;
        identifying, based on a mirror indicator field and a mirror type field of the TCW, a first port to be mirrored and a second port to perform the mirroring, the second port a physical port on a host bus adapter (HBA);
        in response to outbound data being sent to the first port for transmission to a first target device and to the mirror indicator field specifying outbound port mirroring, sending a copy of the outbound data to a second target device via the second port; and
        in response to receiving inbound data at the first port and to the mirror indicator field specifying inbound port mirroring, transmitting a copy of the inbound data to the second target device via the second port,
        wherein the mirror type field of the TCW indicates a specific sub-type of mirroring for the I/O processor to perform.

9. The system of claim 8, wherein the operations further comprise:
    receiving, by the I/O processor, an instruction to send the outbound data to the first target device;
    fetching, by the I/O processor, the outbound data from a memory; and
    sending, by the I/O processor, the outbound data to the first port.

10. The system of claim 8, wherein the operations further comprise:
    receiving, by the I/O processor, the inbound data from the first port; and
    storing, by the I/O processor, the inbound data into a memory.

11. The system of claim 8, wherein the copy of the outbound data sent to the second target device is a subset of the outbound data.

12. The system of claim 8, wherein the copy of the inbound data sent to the second target device is a subset of the inbound data.

13. The system of claim 8, wherein the instruction causes port mirroring to be performed for a plurality of outbound data transmissions on the first port.

14. The system of claim 8, wherein the instruction causes port mirroring to be performed for a single outbound data transmission on the first port.

15. A computer program product comprising a computer readable storage medium having program instructions embodied therewith, the program instructions executable by one or more processors to cause the one or more processors to perform operations comprising:
    receiving a transport control word (TCW) that includes an instruction to perform physical port mirroring;

identifying, based on a mirror indicator field and a mirror type field of the TCW, a first port to be mirrored and a second port to perform the mirroring, the second port a physical port on a host bus adapter (HBA);

in response to outbound data being sent to the first port for transmission to a first target device and based on the mirror indicator field specifying outbound port mirroring, sending a copy of the outbound data to a second target device via the second port; and in response to receiving inbound data at the first port and based on the mirror indicator field specifying inbound port mirroring, transmitting a copy of the inbound data to the second target device via the second port, wherein the mirror type field of the TCW indicates a specific sub-type of mirroring for the I/O processor to perform.

16. The computer program product of claim 15, wherein the operations further comprise:

receiving, by the I/O processor, an instruction to send the outbound data to the first target device;

fetching, by the I/O processor, the outbound data from a memory; and sending, by the I/O processor, the outbound data to the first port.

17. The computer program product of claim 15, wherein the operations further comprise:

receiving, by the I/O processor, the inbound data from the first port; and storing, by the I/O processor, the inbound data into a memory.

18. The computer program product of claim 15, wherein the copy of the outbound data sent to the second target device is a subset of the outbound data.

19. The computer program product of claim 15, wherein the copy of the inbound data sent to the second target device is a subset of the inbound data.

20. The computer program product of claim 15, wherein the instruction causes port mirroring to be performed for a plurality of outbound data transmissions on the first port.

* * * * *